United States Patent
Madour et al.

(10) Patent No.: US 6,834,050 B1
(45) Date of Patent: Dec. 21, 2004

(54) PACKET CORE FUNCTION AND METHOD OF SELECTING A PACKET DATA SERVICE NODE/FOREIGN AGENT IN A PACKET DATA NETWORK

(75) Inventors: Lila Madour, Kirkland (CA); Louis Segura, St-Laurent (CA); Karim Shafik, Dollard-des-Ormeaux (CA)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 659 days.

(21) Appl. No.: 09/658,432

(22) Filed: Sep. 8, 2000

Related U.S. Application Data (60) Provisional application No. 60/188,529, filed on Mar. 10, 2000.

(51) Int. Cl.[7] .............................................. H04L 12/28
(52) U.S. Cl. ........................ 370/392; 370/400; 370/331
(58) Field of Search .......................... 370/210.1, 310.2, 370/313, 328, 331, 338, 349, 389, 392, 400, 401, 410, 465; 455/432.1, 436, 439, 440, 445

(56) References Cited

U.S. PATENT DOCUMENTS

| | | | | |
|---|---|---|---|---|
| 6,137,791 A | * | 10/2000 | Frid et al. ..................... | 370/331 |
| 6,233,458 B1 | * | 5/2001 | Haumont et al. ........... | 455/445 |
| 6,256,300 B1 | * | 7/2001 | Ahmed et al. .............. | 370/331 |
| 6,338,078 B1 | * | 1/2002 | Chang et al. ............... | 709/109 |
| 6,404,754 B1 | * | 6/2002 | Lim ............................ | 370/338 |
| 6,438,370 B1 | * | 8/2002 | Einola et al. ................ | 455/436 |
| 6,463,270 B1 | * | 10/2002 | Chang et al. ............... | 455/403 |
| 6,466,556 B1 | * | 10/2002 | Boudreaux .................. | 370/331 |
| 6,519,235 B1 | * | 2/2003 | Kim et al. ................... | 370/331 |
| 6,539,255 B1 | * | 3/2003 | Brewer et al. ................. | 607/5 |
| 6,556,820 B1 | * | 4/2003 | Le et al. ...................... | 455/411 |
| 6,590,880 B1 | * | 7/2003 | Maenpaa et al. ........... | 370/331 |
| 6,590,905 B1 | * | 7/2003 | Suumaki et al. ............ | 370/466 |
| 6,603,763 B1 | * | 8/2003 | Kishino ...................... | 370/389 |

OTHER PUBLICATIONS

IEEE 9/00 "Research on Timer Setting for the Soft handover algorithm with Different system loads in WCDMA" pp. 741–747 Jujun et al.*
IEEE, 5/00 "Efficient Handoff Rerouting Algorithms: A competitive On–line Algorithmic Approach" pp. 198–207, Yigal et al.*

* cited by examiner

Primary Examiner—Andy Lee
(74) Attorney, Agent, or Firm—Smith & Danamraj, P.C.

(57) ABSTRACT

A Packet Core Function (PCF) and method of consistently selecting a Packet Data Service Node (PDSN) from a plurality of PDSNs in a packet data network to host a data session for a Mobile Node (MN). In a first embodiment, a static lookup table in the PCF is used to associate a list of identifiers for MNs and a list of the plurality of PDSNs in the network. The PCF obtains an identifier for the MN and utilizes the lookup table and a hash function to associate the identifier for the MN with a PDSN. The PDSN is then selected by the PCF to host the data session for the MN. In another embodiment, the PCF also includes a cache timer and a cache memory that stores the identifier for the MN and the IP address of the selected PDSN for a predetermined time period following the handoff of the MN to another PCF. If the MN returns to the PCF within the predetermined period of time, the PCF reselects the same PDSN to host the data session. In another embodiment, following the initial selection of a PDSN to host the data session, the EP address of the PDSN is sent to the MN which then passes the IP address of the PDSN to any subsequent PCFs where the MN roams. A PDSN zone ID may be utilized in lieu of the fill IP address.

7 Claims, 5 Drawing Sheets

PACKET CORE FUNCTION AND METHOD OF SELECTING A PACKET DATA SERVICE NODE/FOREIGN AGENT IN A PACKET DATA NETWORK

PRIORITY STATEMENT UNDER 35 U.S.C. § 119(e) & 37 C.F.R. § 1.78.

This nonprovisional application claims priority based upon the prior U.S. provisional patent application entitled, "Method for Selecting a Packet Data Service Node/Foreign Agent in a Wireless Access", application No. 60/188,529, filed Mar. 10, 2000, in the names of Lila Madour, Louis Segura, Karim Shafik, John Barna, and Jean-Charles Gonthier.

BACKGROUND OF THE INVENTION

1. Technical Field of the Invention

This invention relates to radio telecommunication systems and, more particularly, to a Packet Core Function (PCF) and method of selecting a Packet Data Service Node (PDSN)/Foreign Agent (FA) in a packet data network.

2. Description of Related Art

Code Division Multiple Access (CDMA) 2000 is the third generation system for CDMA networks. It offers packet-switched call routing via Packet Data Service Nodes (PDSNs) which are used as access concentrators and, in the case of Mobile IP, as Foreign Agents (FAs) for roaming mobile subscribers.

Figure 1:
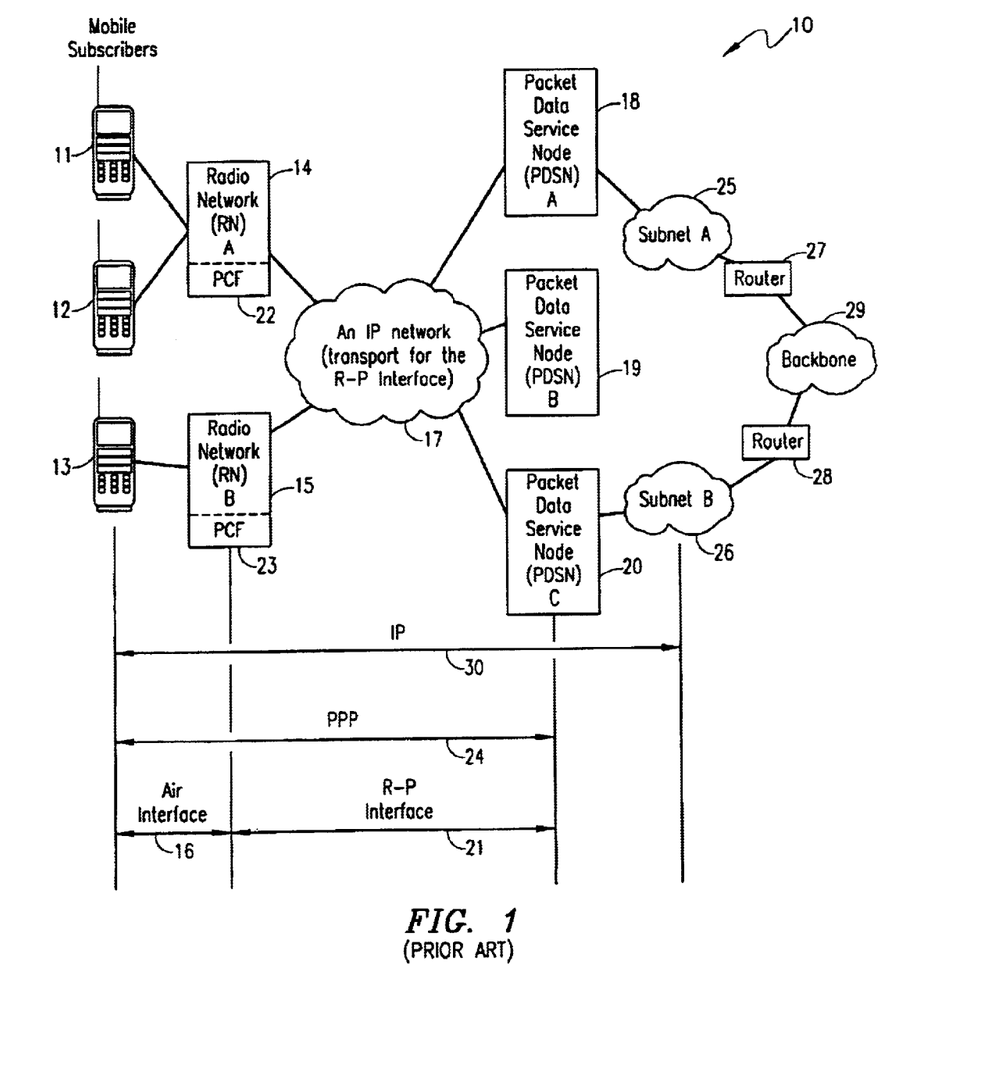
FIG. 1 (Prior Art) is a simplified block diagram of an existing packet data network providing radio access to a plurality of mobile nodes.

FIG. 1 is a simplified block diagram of an existing packet data network 10 providing radio access to a plurality of mobile subscribers utilizing Mobile Nodes (MNs) 11–13. In packet data networks such as CDMA 2000, MNs gain access to the packet core network through Radio Networks (RNs) 14 and 15 over an air interface link 16. An illustration a of the protocols utilized, and where each protocol ends, is shown below the block diagram. An Internet Protocol (EP) network 17 links the RNs to a plurality of PDSNs 18–20 using a Radio-Packet (R-P) interface 21. Each RN may include a plurality of Base Stations (BSs) and Base Station Controllers (BSCs) (not shown). Packet Core Functions (PCFs) 22 and 23 handle the switching of data packets that come from the MNs, and may be located in the BSCs. The PCF selects one PDSN to terminate all of its packet data sessions. When a mobile subscriber desires to initiate a packet data session, the PCF selects a PDSN, and a Point-to-Point Protocol (PPP) connection 24 is established between the subscriber's MN and the selected PDSN. Each time a PPP link is established, negotiation takes place with regards to authentication, compression, etc., followed by Agent advertisement and a Mobile IP registration request.

The PDSNs, in turn, utilize one or more sub-networks 25 and 26, and routers 27 and 28 to access the packet-switched network backbone 29. At that point, the MN is connected to the IP network 17, and the IP protocol 30 may be utilized to access the Internet.

The CDMA 2000 standard describes two possible subscription types for mobile subscribers: "Simple IP" and "Mobile IP". In Simple IP, seamless mobility between different PDSNs is not feasible. For a particular data session, the. IP address for a mobile subscriber's MN is provided by the PDSN handling that particular session. Therefore, the MN cannot be handed over to another PDSN while continuing a data session because the new PDSN would assign a new IP address to the MN. If the MN receives packets with a new IP address, it automatically concludes that the first session has ended. Therefore, if an MN roams from one PDSN to another in Simple IP, the entire session must be re-negotiated from the beginning. This may involve allocation of traffic channels which should be avoided in the event of dormancy, as well as an entire series of protocols in order to reestablish the session. This process could be long enough to be a visible problem to the user.

In Mobile IP, on the other hand, each MN is pre-allocated an IP address that it always uses regardless of the serving PDSN. A Mobile IP protocol layer on top of the IP layer permits a home agent and a foreign agent to tunnel data towards roaming Mobile IP subscribers. Therefore, during a handover, the new PDSN uses the same pre-allocated IP address as was being used by the old PDSN. However, if the MN keeps switching from one PDSN to another, additional allocations of traffic channels are required, which is an inefficient usage of the air interface.

Mobile IP service is currently described in the CDMA 2000 packet data standard IS-835. The existing standard, however, does not effectively describe any methodology by which an MN may consistently select the same PDSN from a packet data network in order to set up its communication links. The standard makes the assumption that when the PCF is selecting a PDSN, the PCF will be able to select the PDSN with which it has a previous PPP connection. However, with the current PDSN-selection procedures, the selection of the same PDSN is not always assured. This issue is important for both Mobile IP users (provided the PPP and the Mobile IP bindings are still active) and Simple IP users, but is particularly critical for Simple IP users where it is even more critical to maintain the connectivity with the same PDSN.

Thus, it would be advantageous for an MN to be able to consistently select the same PDSN for access to the packet data network because this would enable the PPP session between the MN and the PDSN to be preserved. Other proposed solutions to this problem involve methodologies that are performed within the packet core network. These proposals have a centralized view of the network, and require additional network nodes and additional network signaling in order to communicate with or update the configuration of the PDSN and all the current connections that are being set up. It would be preferable to have a solution that is performed in the radio network and does not involve additional nodes or signaling in the core network.

Dormant handoffs are also a problem under the existing standards. In CDMA 2000, the MN goes dormant when no data is transferred over the link for a certain period of time. During the dormant stage, there is no traffic channel assigned to the mobile station; however, the PPP session is maintained. When the dormant MN moves from one packet cell to another, the MN notifies the access network, and the PCF within the access network attempts to select a PDSN for the MN. It would be desirable to select the same PDSN where the PPP and RP connections are still maintained for the Mobile IP user. Otherwise, the network may unnecessarily maintain multiple "hanging PPP connections" in more than one PDSN until the original PPP connections time out and are released. Since PPP resources are expensive to the operator, this is an expensive waste of network resources.

In order to overcome the disadvantage of existing solutions, it would be advantageous to have a method that enables a PCF to consistently select the same PDSN. The method should preferably be a simple selection process that is performed primarily in the radio network, and that does not require the introduction of new nodes or new signaling in the core network to handle the functionality. The present invention provides such a method.

SUMMARY OF THE INVENTION

In one aspect, the present invention is a method of consistently selecting a particular PDSN from a plurality of PDSNs in a packet data network to host a data session for an MN. The method begins by storing a static lookup table in a PCF, the table including a list of identifiers for MNs and an associated list of the plurality of PDSNs in the network. The PCF then obtains an identifier for the MN and utilizes the lookup table to associate the identifier for the MN with a PDSN. The PDSN is then selected by the PCF to host the data session for the MN. The lookup table is preferably stored in every PCF in the network so that the same PDSN is consistently selected for the MN as it roams in different PCFs.

In another aspect, the present invention is a method of reselecting a particular PDSN from a plurality of PDSNs in a packet data network to host a data session for an MN following a handoff of the MN from a source PCF to a target PCF when the MN returns to the source PCF. The source PCF initially assigned the PDSN to host the data session before handing off the MN. The method includes the steps of storing in a cache memory in the source PCF, an identifier for the MN and an IP address for the particular PDSN for a predetermined period of time after handing off the MN. If the MN returns to the source PCF within the predetermined period of time, the PCF reselects the particular PDSN to host the data session.

In yet another aspect, the present invention is a method of consistently selecting a particular PDSN from a plurality of PDSNs in a packet data network to host a data session for an MN. When a PDSN is initially selected to host the data session, the IP address of the PDSN is sent to the MN where it is stored. Thereafter, when the MN roams to another PCF, the MN passes the IP address of the PDSN to the new PCF using, for example, CDMA 2000 air interface layer 3 signaling.

In another aspect, the present invention is a PCF that consistently selects a particular PDSN from a plurality of PDSNs in a packet data network to host a data session for an MN. The PCF includes a static lookup table that includes a list of identifiers for MNs and an associated list of the plurality of PDSNs in the network. The PCF also includes means for obtaining an identifier for the MN, and a hash function that associates the identifier for the MN with the particular PDSN utilizing the lookup table, and selects the particular PDSN to host the data session for the MN. The PCF may also include a cache memory that stores the identifier for the MN and an IP address for the particular PDSN for a predetermined period of time after handing off the MN to another PCF. A cache timer determines whether the predetermined time period has expired, and the PCP reselects the particular PDSN to host the data session if the MN returns to the PCF within the predetermined period of time.

In yet another aspect, the present invention is a system for consistently selecting a particular PDSN from a plurality of PDSNs in a packet data network to host a data session for an MN. The system includes a Radio-Packet (R-P) network that connects each of a plurality of PCFs to the plurality of PDSNs. Each PCF selects a PDSN to host the data session when the MN roams into an area controlled by the PCF. Each of the PCFs includes a lookup table for associating MNs with PDSNs in the network, means for obtaining an identifier for the MN, and a hash function that associates the identifier for the MN with the particular PDSN utilizing the lookup table, and selects the particular PDSN to host the data session for the MN.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

The method of the present invention is a simple selection process that is performed primarily in the radio network, and does not require the introduction of new nodes or new signaling in the core network to handle the functionality. In the selection process, the PCF reselects a PDSN with which it already has an R-P connection if it is hosting a binding that has not expired.

Three embodiments of the present invention are described herein. In a first embodiment, the PCF serving the MN utilizes a simple hash function to initially select a PDSN and to re-select the same PDSN following a dormant handoff to another PCF. A second embodiment also utilizes the hash function for initial PDSN selection, but provides an alternative method of re-selecting the PDSN, following an inter-PCF/intra-PDSN handoff. After initial PDSN selection and the handoff, a cache memory in the original PCF retains the IP address of the PDSN as well as the Mobile Station Identification (MSID) of the MN for a predetermined time period following timeout of the PPP session (i.e., following expiration of the R-P timer). If the MN returns to the original PCF prior to the expiration of the predetermined time period, the PCF uses the MSID and the PDSN IP address to reconnect the MN to the PDSN originally hosting the PPP session. A third embodiment provides an additional alternative method of re-selecting the PDSN, following an inter-PCF/intra-PDSN handoff. In this embodiment, the original PCF supplies the MN with the IP address of the PDSN that has been selected to host the PPP session. Following any hard handoff or dormant handoff, the MN supplies the current serving PCF with the IP address of the PDSN hosting the PPP session.

Simple Hash Function

The present invention utilizes a simple hash function for initial selection of a PDSN. A static lookup table 34 is stored in all PCFs within the operator's domain. The table maintains an ordered list of the PDSNs, the length of which is the number of PDSNs present in an operator's network. Through a simple manipulation of a key field, the MN's International Mobile Station Identifier (IMSI), the hash function utilizes the lookup table to select one of the PDSNs to handle the session. Using a "modulo" function on the MN's IMSI leads to an index that is used to look up the PDSN that should be selected.

The same algorithm is applied consistently by all the PCFs in the radio network; therefore, all of the PCFs should consistently select the same PDSN for a given MN. Thus, as the MN moves across the network and has contact with new BSCs that communicate with new PCFs, the same PDSN is selected. Assuming an even distribution of MN identities, the PPP sessions, and thus the network load, are distributed evenly across the available set of PDSNs in the R-P network.

Table 1 below illustrates an exemplary lookup table 34 utilized by the simple hash function. The IP address of each PDSN is associated with a number equal to the PDSN number minus one (1).

TABLE 1

| (IMSI) Modulo (Number_of_PDSN) | PDSN ref |
|---|---|
| 0 | PDSN_1 address |
| 1 | PDSN_2 address |
| . | . |
| . | . |
| . | . |
| Number_of_PDSN-1 | PDSN_n address |

Use of the hash function assumes that when a PDSN is selected, that PDSN is available for selection. A problem could arise if the PDSN indicated by the lookup table is not available. For example, the PDSN may be temporarily congested. In this case, an alternate PDSN may be selected for the MN. However, if the network is properly dimensioned to allow for peak loads, the PDSN that is selected should be available and able to provide the service that it is expected to provide.

The present invention assumes that each PCF services one or more BSC's. Each BSC, conversely, can be serviced by one and only one PCF. An additional assumption is that within one carrier's domain, all PCFs and all PDSNs are interconnected via a single R-P network, or a network of R-P networks, that allows any PCF to connect to any PDSN. There are no signaling interface changes imposed by the PDSN selection hash table and algorithm. The above hash table algorithm should be distributed throughout the PCFs in a carrier's domain for maximum benefit.

The solution utilizing only the simple hash function does not attempt to preserve the PPP session during an intersystem dormant handoff across carrier boundaries. The PPP session in the old serving system is not preserved, and eventually times out. It is assumed that the operator in the target system will deploy a selection scheme that will select a PDSN within the target operator's own domain.

Example Utilizing Simple Hash Function

Figure 2:
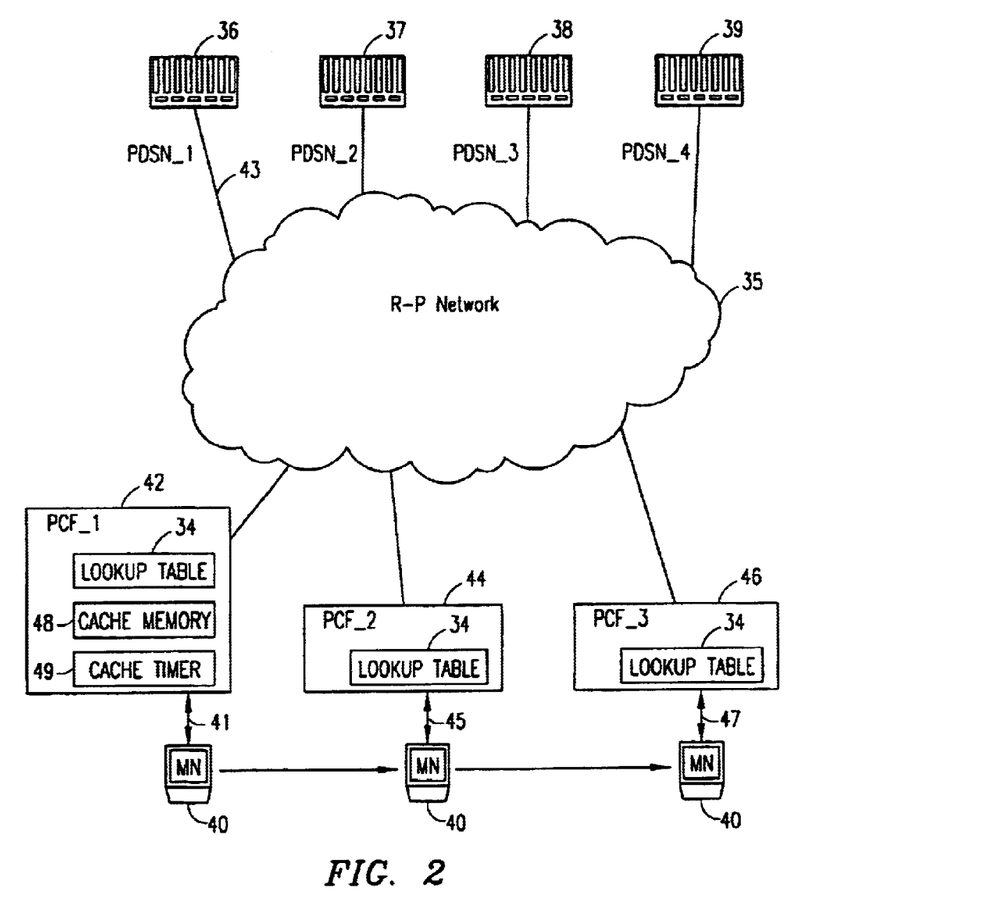
FIG. 2 is a simplified block diagram of an R-P network illustrating a PDSN-selection scenario in which a simple hash function is utilized for PDSN selection according to the teachings of the present invention.

FIG. 2 is a simplified block diagram of an R-P network 35 illustrating a PDSN-selection scenario in which a simple hash function is utilized for PDSN selection from a plurality of PDSNs 36–39 distributed throughout a network. First, an MN 40 sends an origination message 41 to PCF_1 (42). Based on the MN's IMSI, PCF_1 determines, using the hash function, an index into the static lookup table 34 of PDSNs. Connection to PDSN_1 (36) is determined, and an R-P link 43 is established with PDSN_1 followed by PPP connection establishment and Mobile IP registration.

Next, the MN 40 roams into the coverage of PCF_2 (44) (this can be a hard handoff or a dormant handoff). If it is a hard handoff, the handoff request 45 contains the IP address of the serving PDSN_1 (PPP connection). If it is a dormant handoff, PCF_2 uses the lookup table 34 where the IMSI of the MN points to the PDSN presently hosting the PPP connection (PDSN_1). The PPP connection is thus kept alive, and PCF_2 only negotiates the establishment of a new R-P link to PDSN_1.

Next, the MN roams into the coverage of PCF_3 (46) (this can be a hard handoff or a dormant handoff). If it is a hard handoff, the handoff request 47 contains the address of the serving PDSN_1 (PPP connection). If it is a dormant handoff, PCF_3 uses the lookup table 34 where the IMSI of the MN points to the PDSN presently hosting the PPP connection (PDSN_1). The PPP connection is thus kept alive, and PCF_3 only negotiates the establishment of a new R-P link to PDSN_1.

The MN may also roam into the coverage of another PCF (not shown) in another operator's network (this can be a hard handoff or a is dormant handoff). If it is a hard handoff, the handoff request contains the address of the serving PDSN_1 (PPP connection). If it is a dormant handoff, the PPP session in the old serving system is not preserved, and eventually times out. The simple hash function does not attempt to preserve the PPP session during an intersystem dormant handoff across carrier boundaries. Instead, the operator in the target system deploys a selection scheme that selects a PDSN within the target operator's own domain.

Simple Hash Function With Cache Information

A second embodiment provides an alternative method of re-selecting the PDSN, following an inter-PCF/intra-PDSN handoff. This embodiment helps to ensure that during the lifetime of a PPP session, the same PDSN is selected when the user returns to a previously visited PCF following handoffs. After initial PDSN selection with the hash function, and the inter-PCF/intra-PDSN handoff, a cache memory 48 in the original PCF serving the MN retains the IP address of the PDSN as well as the Mobile Station Identification (MSD) of the MN for the duration of a cache timer 49. The cache timer is set to a value at least equal to the R-P timer so that the information is retained for an additional period of time following timeout of the PPP session (i.e., following expiration of the R-P Ad timer). If the MN returns to the original PCF prior to the expiration of the cache timer 49, the PCF determines which PDSN to select from the stored MSID and PDSN IP address. The PCF then reconnects the MN to the PDSN originally hosting the PPP session. If the cache timer expires before the MN returns to the original PCF, all cached information is eliminated. The setting of the cache timer may be manually configured in the PCF, or may be provided by the PDSN on the A11 interface. The MSID and PDSN IP address are already available in the PCF.

This embodiment offers the benefit of consistently selecting the same PDSN even under the abnormal network condition in which an alternate PDSN was originally selected for the MN by the hash function because of temporary congestion in the preferred PDSN. When a dormant handoff has been performed, and the MN returns to the PCF before the cache timer 49 has expired, the alternate PDSN is again selected, even if the congestion in the preferred PDSN has cleared. This process preserves the existing PPP session, while the hash function alone would revert to the preferred PDSN.

PDSN IP Address at Originating Access

A third embodiment provides an additional alternative method of re-selecting the PDSN, following an inter-PCF/intra-PDSN handoff. In this embodiment, the original PCF sends an Information Message to the MN with the IP address of the PDSN that has been selected to host the PPP session using, for example, CDMA 2000 layer 3 signaling. Following any dormant handoff (origination request), the MN supplies the new serving PCF with the IP address of the PDSN hosting the PPP session.

Figure 3:
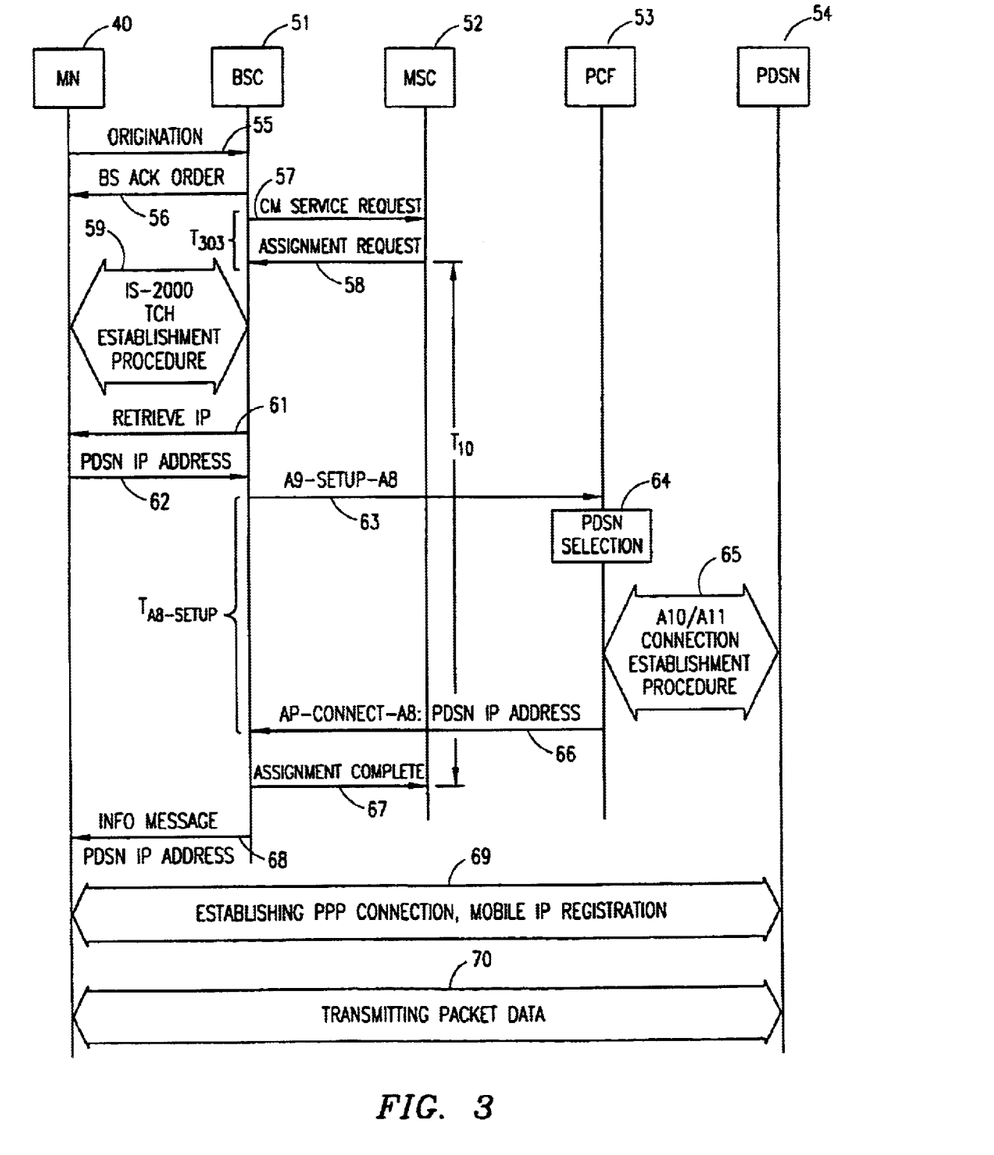
FIG. 3 is a message flow diagram illustrating the flow of messages when a PDSN IP address is provided to an MN at R-P establishment in accordance with the teachings of the present invention.

FIG. 3 is a message flow diagram illustrating the flow of messages when a PDSN IP address is provided to an MN 40 at R-P establishment in accordance with the teachings of the present invention. The messages are sent between the MN 40, a Base Station Controller (BSC) 51, a Mobile Switching Center (USC) 52, a PCF 53, and a PDSN 54. At 55, the MN sends an origination message to the BSC which returns a BS Acknowledgment Order 56. The BSC then sends a Connection Management (CM) Service Request 57 to the MSC which returns an Assignment Request 58 within time T303. An IS-2000 Traffic Channel (TCH) Establishment procedure 59 is then conducted between the MN and the BSC.

If the MN 40 already has a PPP session in progress, and the MN did not report its PDSN IP address in the Origination message, the BSC sends the MN a message to retrieve the IP address of the assigned PDSN at 61. At 62, the MN sends the IP address of the PDSN hosting its PPP session. In the illustrated scenario, it is assumed that the MN does not have a PPP session in progress, or the PDSN IP address provided by the MN is not routable/reachable from the new PCF for some reason. In this case, the BSC sends an A9-Setup-A8 message 63 to the PCF 53, and the PCF selects a PDSN at 64 to host the PPP session. The PCF may utilize the hash table and the IMSI of the MN to select the PDSN. However, if the MN does have a PPP session in progress, the A9-Setup-A8 message is augmented to carry the PDSN IP address to the PCF. In either event, once the PDSN is identified, the PCF has the necessary information to initiate communication (A10/A11 Connection Establishment 65) with the same PDSN, thereby preserving the PPP session for the MN.

At 66, the PCF then sends an A9-Connect-A8 message to the BSC 51, including the PDSN IP address. The BSC then sends an Assignment Complete message 67 to the MSC 52. The BSC also sends a CDMA 2000 Information message 68 to the MN 40, including the PDSN IP address. The Information message should preferably be sent as a layer 3 CDMA 2000 message rather than as an application message, a Mobile IP message, or a PPP message. The establishment of the PPP connection, and the Mobile IP registration are then completed at 69, and at 70, the transmission of packet data begins between the MN and the PDSN.

Figure 4:
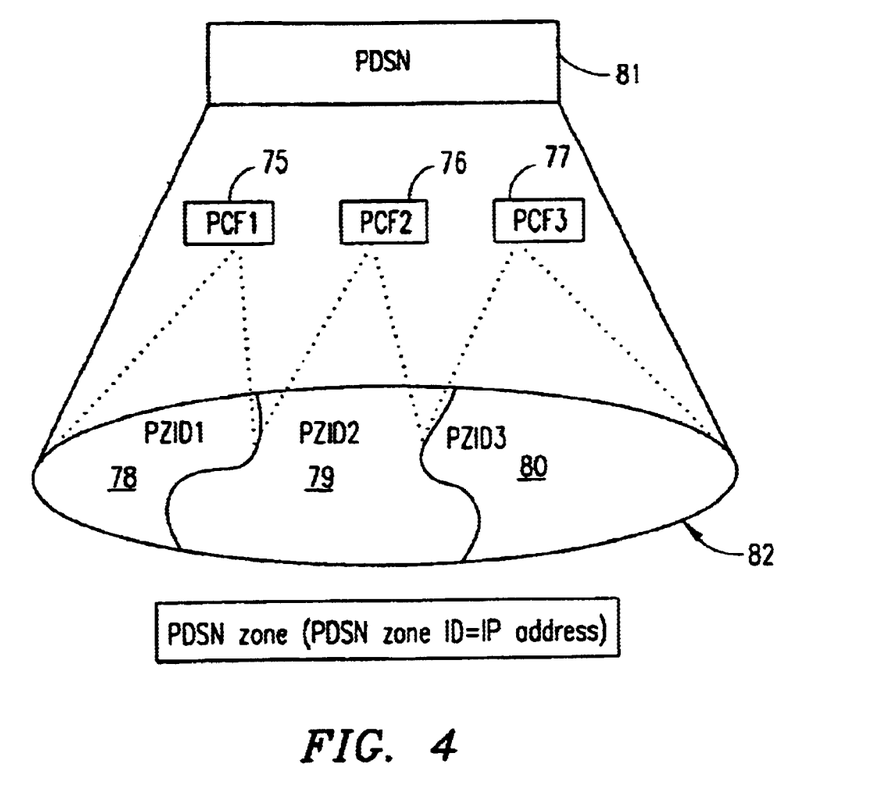
FIG. 4 is an illustrative drawing of a packet zone hierarchy that may be utilized to transfer the PDSN IP address to the MN in an alternative embodiment of the present invention.

FIG. 4 is an illustrative drawing of a packet zone hierarchy that may A be utilized to transfer the PDSN IP address to the MN in an alternative embodiment of the present invention. An IP address comprises 32 bits, and it may be desirable to transmit fewer bits over the air interface to the MN. In the hierarchy, PCF1 75, PCF2 76, and PCF3 77 each have an associated PCF zone ID (PZID1 78, PZID2 79, and PZID3 80, respectively). In addition, the PDSN 81 has an associated PDSN zone ID 82 that encompasses the PCF zones. Since every radio network entity has its own zone ID, then a table can be built associating IP addresses and zone IDs. Then, only the zone ID has to be transmitted over the air interface. While this embodiment has the disadvantage of having to set up tables, it does reduce the number of bits that have to be transmitted over the air interface.

Figure 5:
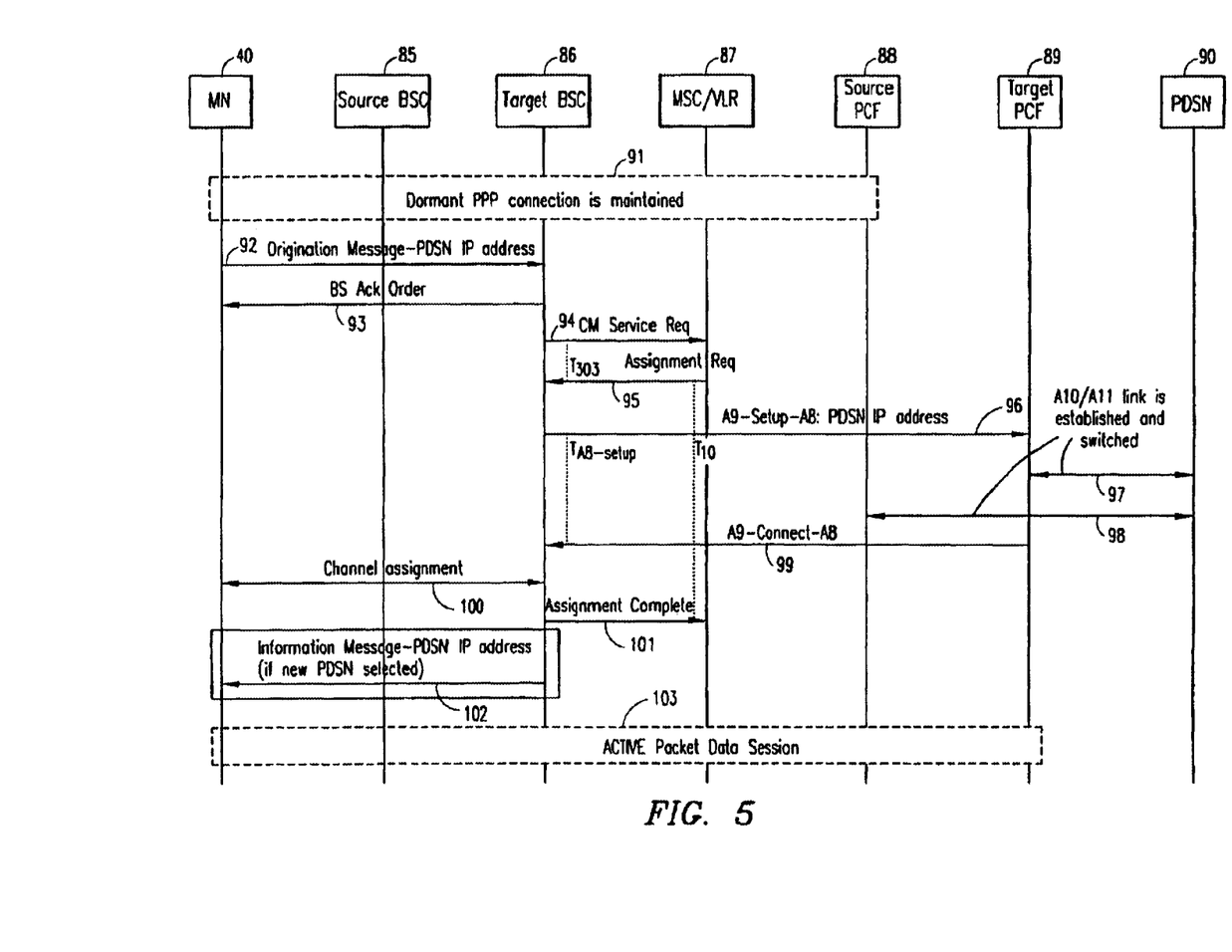
FIG. 5 is a message flow diagram illustrating the flow of messages when a PDSN IP address is provided by the MN following a dormant inter-PCF handoff in accordance with the teachings of the present invention.

FIG. 5 is a message flow diagram illustrating the flow of messages when a PDSN IP address is provided by the MN following a dormant inter-PCF handoff in accordance with the teachings of the present invention. The messages are sent between the MN 40, a Source BSC 85, a Target BSC 86, a Mobile Switching CenterNisitor Location Register (MSC/VLR) 87, a Source PCF 88, a Target PCF 89, and a PDSN 90. At 91, it is noted that the dormant PPP connection is maintained.

At 92, the MN 40 sends an Origination message to the Target BSC 86, including the PDSN IP address that it was provided when a PDSN was first assigned by the MN's original serving PCF. The Target BSC returns a BS Acknowledgment Order 93. The Target BSC then sends a CM Service Request 94 to the MSC/VLR 87 which returns an Assignment Request 95 within time T303. Since the MN 40 already has a PPP connection, the Target BSC sends an A9-Setup-A8 message to the Target PCF 89, including the PDSN IP address. The Target PCF then has the necessary information to establish an A10/A11 link 97 with the PDSN 90, thereby preserving the PPP session for the MN. If the Target PCF is unable to receive the PDSN IP address, it may use the hash function to reselect the PDSN or select another PDSN. At 98, the link is switched between the Source PCF 88 and the PDSN.

At 99, the Target PCF 89 then sends an A9-Connect-A8 message to the Target BSC 86. The Target BSC assigns a channel to the MN at 100, and sends an Assignment Complete message 101 to the MSC/VLR 87. If the Target PCF was unable to receive the old PDSN IP address, and a new PDSN was selected, the Target BSC also sends a CDMA 2000 Information message 102 to the MN 40, including the new PDSN IP address. At 103, the transmission of packet data begins between the MN and the PDSN.

In summary, each of the embodiments of the present invention offer a different level of benefits. The simple hash function guarantees PPP session preservation under normal network conditions within a single operator's domain. However, the hash function fails to address the situation in which the MN roams beyond the coverage area of the operator's domain. For example, if the MN roams into the coverage area of another carrier, the PPP session will not be preserved since the PDSN selection will be based on the new operator's hash function as well as its own configuration table. The result will be the selection of a PDSN within the new operator's network, which could be desirable in this case.

Utilizing a cache memory with the MN's MSID and the PDSN's IP address provides an extra benefit when the MN performs an inter-carrier handoff. Following a hard handoff, the cache guarantees the selection of the same PDSN if the MN returns to the original PCF since the PDSN IP address is transferred via signaling. If the MN goes dormant and travels back and forth between the original PCF and another PCF, the cache information guarantees the selection of the same PDSN as long as the cache timer has not expired.

The solution in which the PDSN IP address or the PDSN zone ID is sent to the MN following the R-P connection establishment enables the MN to pass the PDSN IP address in the Origination message following dormant handoff. This provides a simple and complete solution for all scenarios.

It is thus believed that the operation and construction of the present invention will be apparent from the foregoing description. While the method shown and described has been characterized as being preferred, it will be readily apparent that various changes and modifications could be made therein without departing from the scope of the invention as defined in the following claims.

What is claimed is:

1. A method of consistently selecting a particular Packet Data Service Node (PDSN) from a plurality of PDSNs in a packet data network to host a data session for a Mobile node (MN), said method comprising the steps of:

storing a static lookup table in a Packet Core Function (PCF), said table including a list of identifiers for MNs and an associated list of the plurality of PDSNs in the network;

utilizing the lookup table by the PCF to associate an identifier for the MN with the particular PDSN;

selecting the particular PDSN by the PCF to host the data session for the MN;

storing in a cache memory of the PCF, an identifier for the MN and an Internet Protocol (IP) address for the particular PDSN for a predetermined period of time after handing off the MN to another PCF;

determining whether the MN returned to the PCF within the predetermined Period of time; and reselecting the particular PDSN to host the data session if the MN returned to the PCF within the predetermined period of time.

2. The method of consistently selecting a particular PDSN of claim 1 wherein the network includes a plurality of PCFs, and the step of storing a static lookup table in a PCF includes storing the lookup table in every PCF in the network.

3. The method of consistently selecting a particular PDSN of claim 2 further comprising the steps of:

performing a dormant handoff procedure to hand off the MN from a source PCF to a target PCF in the network, said dormant handoff procedure including the step of passing the identifier for the MN to the target PCF;

utilizing the lookup table by the PCF to associate the an identifier for the MN with the selected PDSN; and connecting the MN to the selected PDSN by the target PCF.

4. The method of claim 2, the method further comprising the steps of:

initially selecting, by the PCF, the particular PDSN to host the data session;

sending an information message from the PCF to the MN via a Base Station Controller (BSC) with an indication of the IP address of the particular PDSN; and passing the IP address of the particular PDSN from the MN to at least another PCF where the MN roams in the network.

5. The method of claim 1 includes the step of obtaining by the PCF, an identifier for the MN before utilizing the lookup table by the PCF to associate the identifier for the MN with the particular PDSN.

6. The method of consistently selecting the particular PDSN of claim 4 wherein the indication of the IP address of the selected PDSN is a PDSN zone ID.

7. A Packet Core Function (PCF) that consistently selects a particular Packet Data Service Node (PDSN) from a plurality of PDSNs in a packet data network to host a data session for a Mobile Node (MN), said PCF comprising:

a static lookup table that includes a list of identifiers for MNs and an associated list of the plurality of PDSNs in the network;

means for associating the identifier for the MN with the particular PDSN utilizing the lookup table, and selecting the particular PDSN to host the data session for the MN;

a cache memory that stores the identifier for the MN and an Internet Protocol (IP) address for the particular PDSN for a predetermined period of time after handing off the MN to another PCF;

a cache timer for determining when the predetermined time period has expired; and means for reselecting the particular PDSN to host the data session if the MN returns to the PCF within the predetermined period of time.

* * * * *

UNITED STATES PATENT AND TRADEMARK OFFICE
CERTIFICATE OF CORRECTION

PATENT NO.        : 6,834,050 B1
APPLICATION NO. : 09/658432
DATED             : December 21, 2004
INVENTOR(S)      : Madour et al.

It is certified that error appears in the above-identified patent and that said Letters Patent is hereby corrected as shown below:

On the title page, item (57), under "ABSTRACT", in Column 2, Line 18, delete "EP" and insert -- IP --, therefor.

In Column 1, Line 36, after "illustration" delete "a".

In Column 1, Line 38, delete "(EP)" and insert -- (IP) --, therefor.

In Column 3, Line 51, delete "PCP" and insert -- PCF --, therefor.

In Column 6, Line 17, delete "is" before "dormant".

In Column 6, Line 36, delete "(MSD)" and insert -- (MSID) --, therefor.

In Column 6, Line 40, after "R-P" delete "Ad".

In Column 7, Line 10, delete "(USC)" and insert -- (MSC) --, therefor.

In Column 7, Line 48, after "may" delete "A".

In Column 7, Line 67, delete "CenterNisitor" and insert -- Center/Visitor --, therefor.

In Column 9, Line 15, in Claim 1, delete "Period" and insert -- period --, therefor.

In Column 9, Line 30, in Claim 3, after "associate" delete "the".

Signed and Sealed this

Fifteenth Day of April, 2008

JON W. DUDAS
*Director of the United States Patent and Trademark Office*